UNITED STATES PATENT OFFICE.

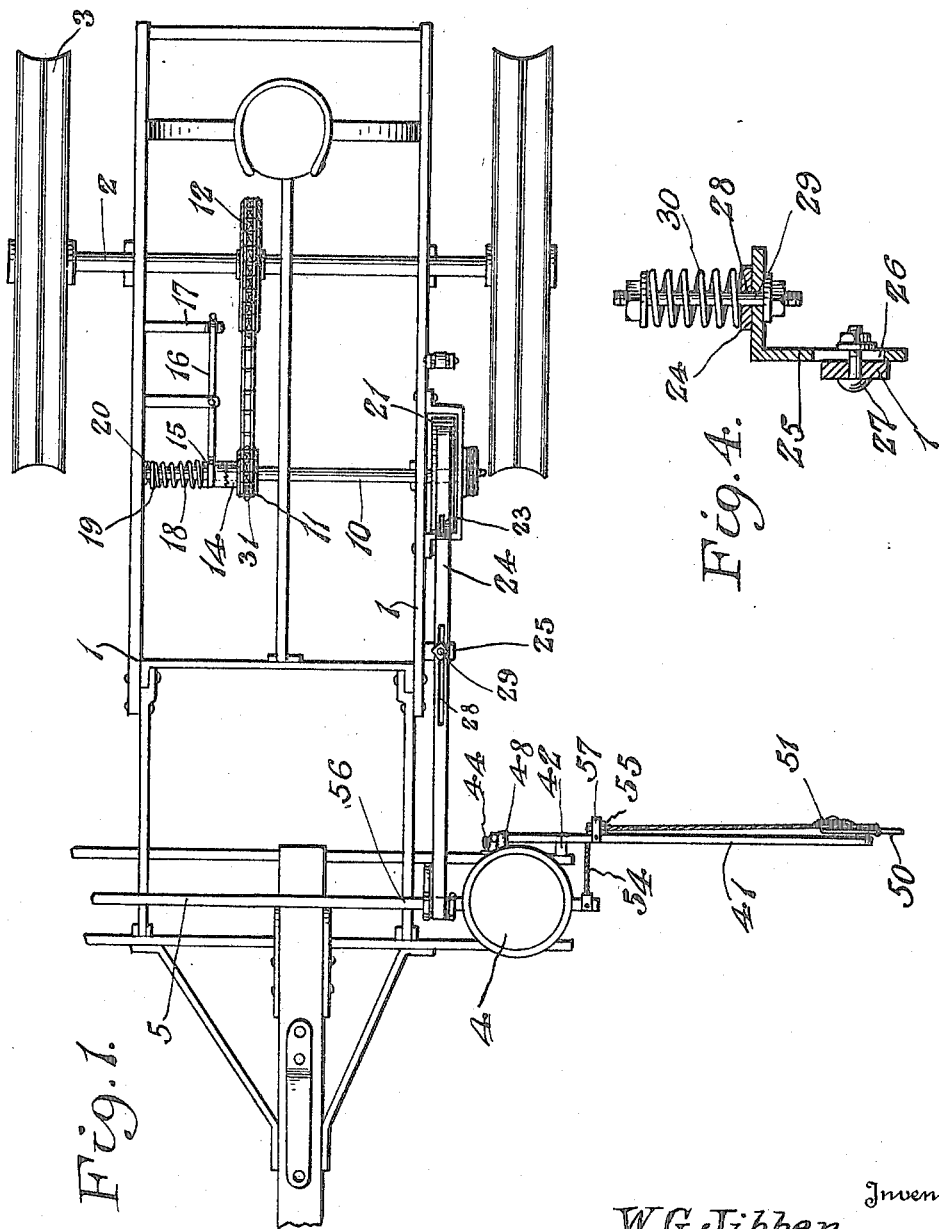

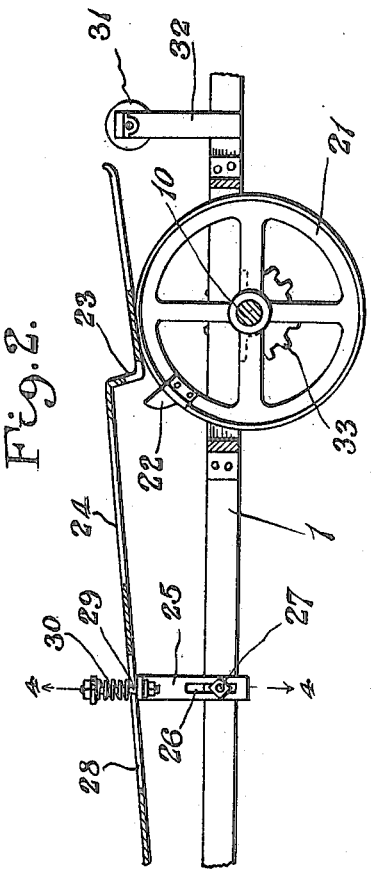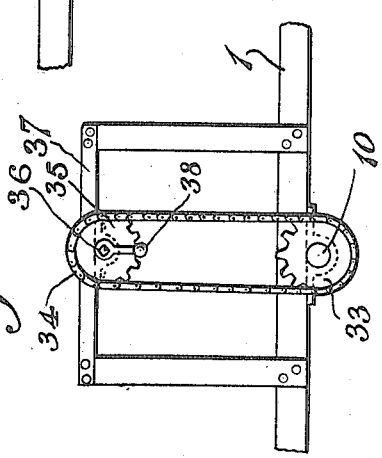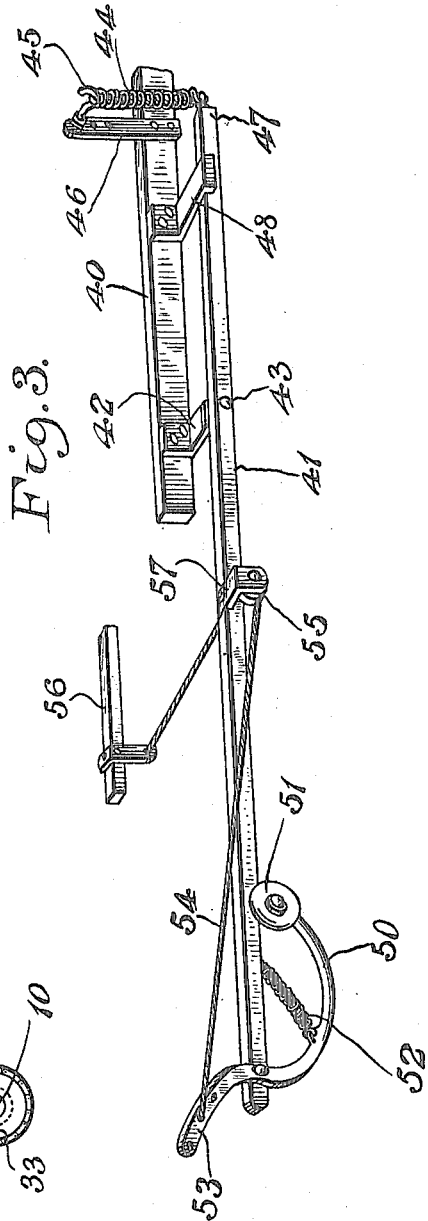

WILLIAM G. JIBBEN, OF DAVIS, SOUTH DAKOTA.

CORN-PLANTER ATTACHMENT.

1,207,556.  Specification of Letters Patent.  Patented Dec. 5, 1916.

Application filed July 18, 1914. Serial No. 851,752.

*To all whom it may concern:*

Be it known that I, WILLIAM G. JIBBEN, a citizen of the United States, residing at Davis, in the county of Turner and State of South Dakota, have invented certain new and useful Improvements in Corn-Planter Attachments; and I do hereby declare the following to be a full, clear, and exact description of the invention, such as will enable others skilled in the art to which it appertains to make and use the same.

This invention relates to corn planters and more particularly to an attachment for what is commercially known as check-row corn planters, which will eliminate the use of the checking wires which are now employed for the proper checking of the planting of the hills of corn.

A further object of this invention is the provision of a mechanism which is operated by the traction of the corn planter for operating the seed dispensing mechanism for planting the corn in what is known as check-rows and also to provide a marker which is operated synchronously with the depositing of the seed in a hill, for marking the space directly opposite to where the hill of corn has been planted for guiding the planter in the planting of the adjacent row.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a top plan view of the improved corn planter. Fig. 2 is a detailed view partially in section of the mechanism for operating the seed dispensing mechanism at predetermined times for planting the rows in hills. Fig. 3 is a detailed perspective view of the improved marker which is operated by the planting mechanism for designating the position of a row of corn for guiding and the planting of the adjacent row. Fig. 4 is a cross sectional view on the line 4—4 of Fig. 2, and Fig. 5 is a detailed view in a side elevation of a part of the construction of the corn planter.

Referring more particularly to the drawings, 1 designates the corn planter frame which has a traction wheel supporting axle 2 carried thereby and the usual type of traction wheels 3 mounted thereupon. The corn planter frame 1 has the usual type of seed dispensing mechanism 4, such as is employed in check-row corn planters, positioned upon the forward end of the same and two seed boxes connected by a seed dispensing shaft 5, which regulates the depositing of the seed from the seed retaining boxes upon the ground.

The frame 1 has a shaft 10 extending transversely thereacross and parallel with the axle 2, which shaft has a sprocket 11 loosely mounted thereupon. The sprocket 11 has sprocket chain connection with a sprocket 12 which is mounted upon the axle 2, for driving the shaft 10 upon the rotation of the axle 2. The sprocket 11 has a clutch segment 14 mounted upon one base thereof which is adapted to coact or mesh with the clutch segment 15 which is slidably mounted upon the shaft 10 for rotation therewith. The clutch segment 15 has a lever 16 connected thereto for the sliding of the clutch segment upon the shaft, for causing it to mesh with the segment 14 when it is so desired. The lever 16 may be operated by any suitable type of hand or foot trip 17.

A spiral spring 18 is coiled about the shaft 10 and engages the outer end of the clutch segment 15 and also a washer 19 which is held upon the terminal end of the shaft 10 by a pin 20, which pin is inserted transversely through the shaft. The spring 18 tends to hold the segment 15 in meshing engagement with the segment 14 after the segment 15 has been operated by the operation of the lever 16.

The shaft 10 which extends transversely through the corn planter frame 1 has a drum 21 mounted thereupon, which drum or wheel has a finger 22 secured thereto and extending radially from the periphery of the drum for engagement with shoulder 23 which is formed upon the seed mechanism operating bar 24.

The seed mechanism operating bar 24 is supported by a bracket 25, which bracket is adjustably connected to the corn planter frame 1 through the medium of the slot 26 and a bolt 27, so as to vary the elevation of the seed dispensing mechanism operating bar above the corn planter frame 1.

The seed dispensing mechanism operating bar 24 is provided with a longitudinally extending slot 28, which receives a bolt 29, which bolt is supported by the bracket 25. A spiral spring 30 is coiled about the bolt 29 and it engages the upper surface of the bar 24, bearing downwardly upon the same for holding it in a position so that the shoulder 23 will be engaged by the finger 22 during the rotation of the wheel or drum 21. A buffeting roller 31 is supported by a bracket 32, which bracket is secured to the frame 1, rearwardly of the wheel or drum 21, and it receives the bar 24 thereupon after the same has been actuated by the finger 22, for properly guiding the return operation of the bar 24. The shaft 10 has a sprocket 33 mounted thereupon, which sprocket has chain connection through the medium of the chain 34 with the sprocket 35. The sprocket 35 is mounted upon a stub-shaft 36, which is supported by an auxiliary frame 37, and the stub-shaft has a crank handle 28 formed thereupon. The crank handle 38, sprocket 33 and 35 and the chain 34 are provided for the rotating of the drum 21 for the proper positioning of the finger 22 for the operation of the bar 24 preparatory to the starting of the planting of a row of corn. The bar 24 is rectangular in cross section.

The corn planter shoe frame 40 has a marker bar 41 pivotally connected thereto through the medium of a bracket 42 and a pin 43. The marker bar 41 has a spiral spring 44 connected to its rear end which spiral spring is also secured to a hook 45. The hook is supported by a vertical arm 46 which is secured to the corn planter frame in any suitable manner and the spring 44 tends to hold the end 47 of the marker bar 41 in an upward position at all times and also returns it to its normal position after the marker bar has been operated for designating the position of the planting of a hill of corn. A suitable bracket 48 is carried by the bar 40 and limits the upward movement of the end 47 of the marker bar 41.

The marker bar 41 has an arcuate arm 50 pivotally connected to its outer terminal end, which arcuate arm has a marking roller 51 mounted upon one of its terminal ends, namely the end which is positioned beneath the bar 41. The arcuate arm 50 is connected to the marker bar 41 by a spiral spring 52, which spring tends to hold the roller 51 in an upward position and out of engagement with the ground over which the corn planter is passing. The upper end 53 of the arcuate arm 50, which is opposed to the end which supports the roller 51, has a flexible member 54 connected thereto, which flexible member passes about a roller 55 and is connected to the seed dispensing mechanism operating shaft 56 so that upon the rotation of the shaft 56 the flexible member 54 will be drawn for moving the arcuate arm 50 so as to cause the roller 51 to move into engagement with the ground and leave a designating mark thereupon, which shows the position of the various hills of corn which are being planted. The roller 55 is supported by an angle brace 57 which is carried by the marker bar 41.

In the operation of the improved check-row attachment for corn planters: when it is desired to plant the corn in check-rows, the clutch segment 15 should be moved through the medium of the lever 16, so that it will mesh with the clutch segment 14 which is formed upon one side of the sprocket 11. The meshing engagement between the two clutch segments will rotate the shaft 10 synchronously with the rotation of the axle 2, and it will consequently rotate the drum or wheel 21. The rotation of the wheel or drum 21 will operate the bar 24 through the contact between the finger 22 and the shoulder 23 formed upon the bar, which will rotate the seed dispensing operating shaft 56, causing the seed to be deposited in hills or at spaced intervals along the line of travel of the corn planter. The arm 50 being connected to the shaft 56, through the medium of the flexible member 54 will be moved downwardly with the operation of the shaft 56 and the flexible member 54 is connected to the shaft 56 in such manner that the arm will be actuated for causing the roller 51 to engage the ground upon the dispensing of the seed from the seed dispensing mechanism, which will mark at definite intervals spots spaced laterally to the hill which has been planted, enabling the person driving the corn planter to get each and every one of the rows and hills in exact alinement with each other.

From the foregoing description taken in connection with the accompanying drawings the advantages of the construction and of the method of operation of the improved corn planter attachment will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a corn planter structure, the combination, of a supporting frame, a seed dispensing mechanism carried by the forward end of said frame and including an operating shaft, an axle rotatably supported by said frame, an auxiliary shaft rotatably supported by said frame, power transmitting means operatively connecting said auxiliary shaft and said axle, means for controlling the rotation of said auxiliary shaft by the rotation of said axle, a drum mounted upon said auxiliary shaft, a tooth detachably connected to said drum and extending radially from the periphery thereof, a bar yieldably connected to said frame and having a shoulder formed thereon intermediate its ends, said bar being connected to said seed dispensing mechanism operating shaft, means to permit the limited vertical movement of said bar with respect to said shaft, said tooth adapted to engage said shoulder during the rotation of said drum for moving said bar longitudinally for rotating said operating shaft, a stub shaft rotatably supported by said frame, a crank handle connected to said stub shaft, means connecting said stub shaft to said auxiliary shaft for rotating said auxiliary shaft upon rotation of the stub shaft.

2. In a corn planter structure, the combination, of a supporting frame, a seed dispensing mechanism carried by the forward end of said frame and including an operating shaft, an axle rotatably supported by said frame, an auxiliary shaft rotatably supported by said frame, power transmitting means operatively connecting said auxiliary shaft and said axle, means for controlling the rotation of said auxiliary shaft by the rotation of said axle, a drum mounted upon said auxiliary shaft, a tooth detachably connected to said drum and extending radially from the periphery thereof, a bar yieldably connected to said frame and having a shoulder formed thereon intermediate its ends, said bar being connected to said seed dispensing mechanism operating shaft, means to permit the limited vertical movement of said bar with respect to said shaft, said tooth adapted to engage said shoulder during the rotation of said drum for moving said bar longitudinally for rotating said operating shaft, a stub shaft rotatably supported by said frame, a crank handle connected to said stub shaft, means connecting said stub shaft to said auxiliary shaft for rotating said auxiliary shaft upon rotation of the stub shaft, a buffeting roller carried by said frame in the path of said bar for receiving the bar when released by said tooth.

In testimony whereof I affix my signature in presence of two witnesses.

WILLIAM G. JIBBEN.

Witnesses:
H. P. TEMPLE,
H. J. ALBERT.

Copies of this patent may be obtained for five cents each, by addressing the "Commissioner of Patents, Washington, D. C."